Aug. 14, 1928.　　　　　　　　　　　　　　　　1,680,467
M. H. MATHESON
METHOD OF MANUFACTURING AUTOMOBILE FENDERS
Filed Aug. 23, 1926　　　　5 Sheets-Sheet 1

INVENTOR.
MARTIN H. MATHESON
BY
Parker & Burton
ATTORNEY.

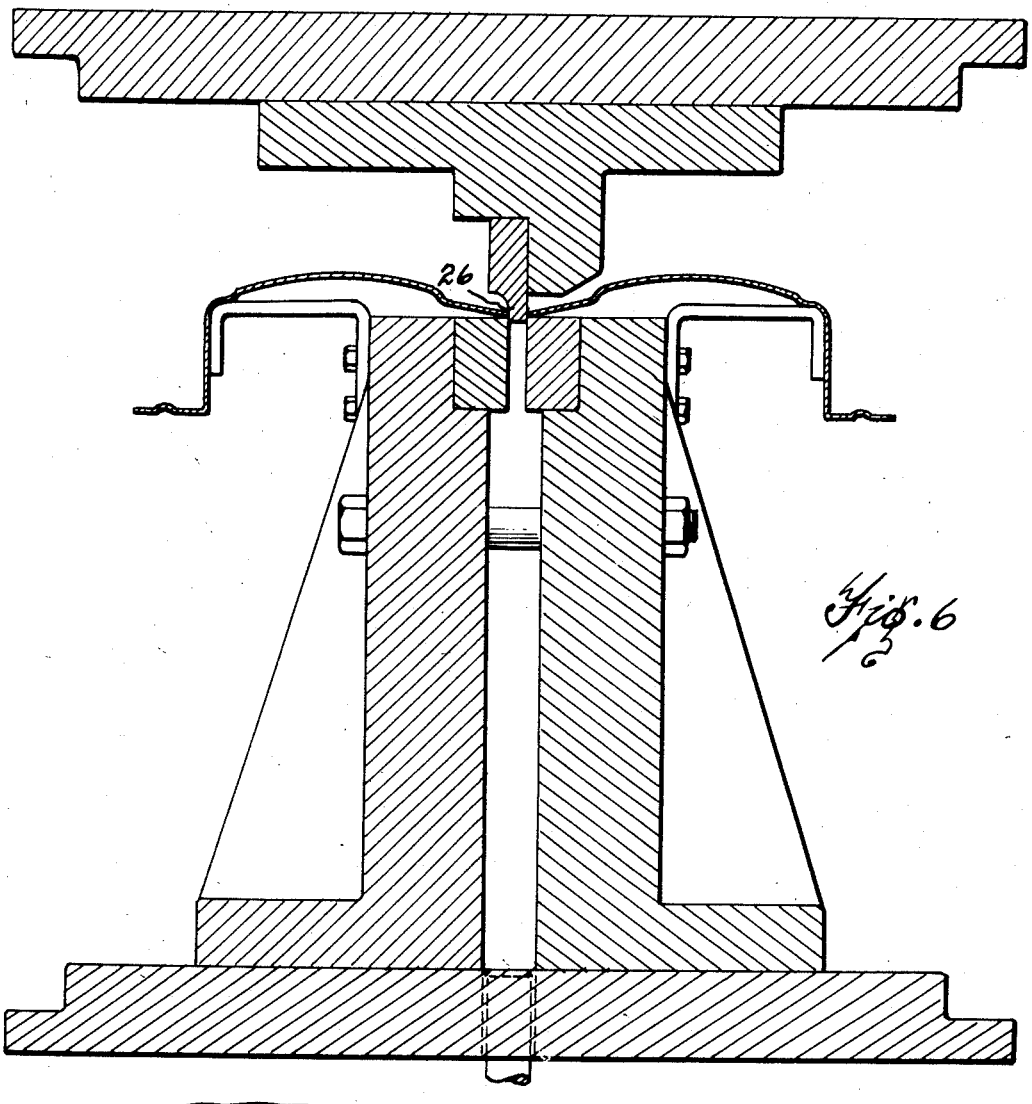
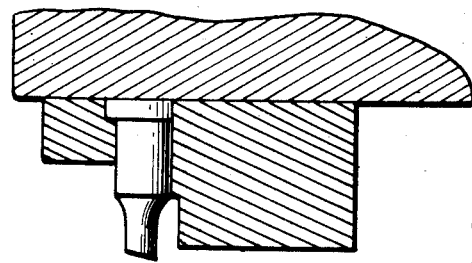
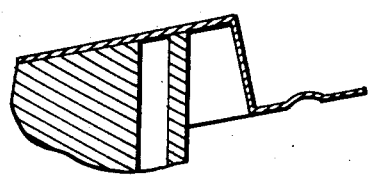

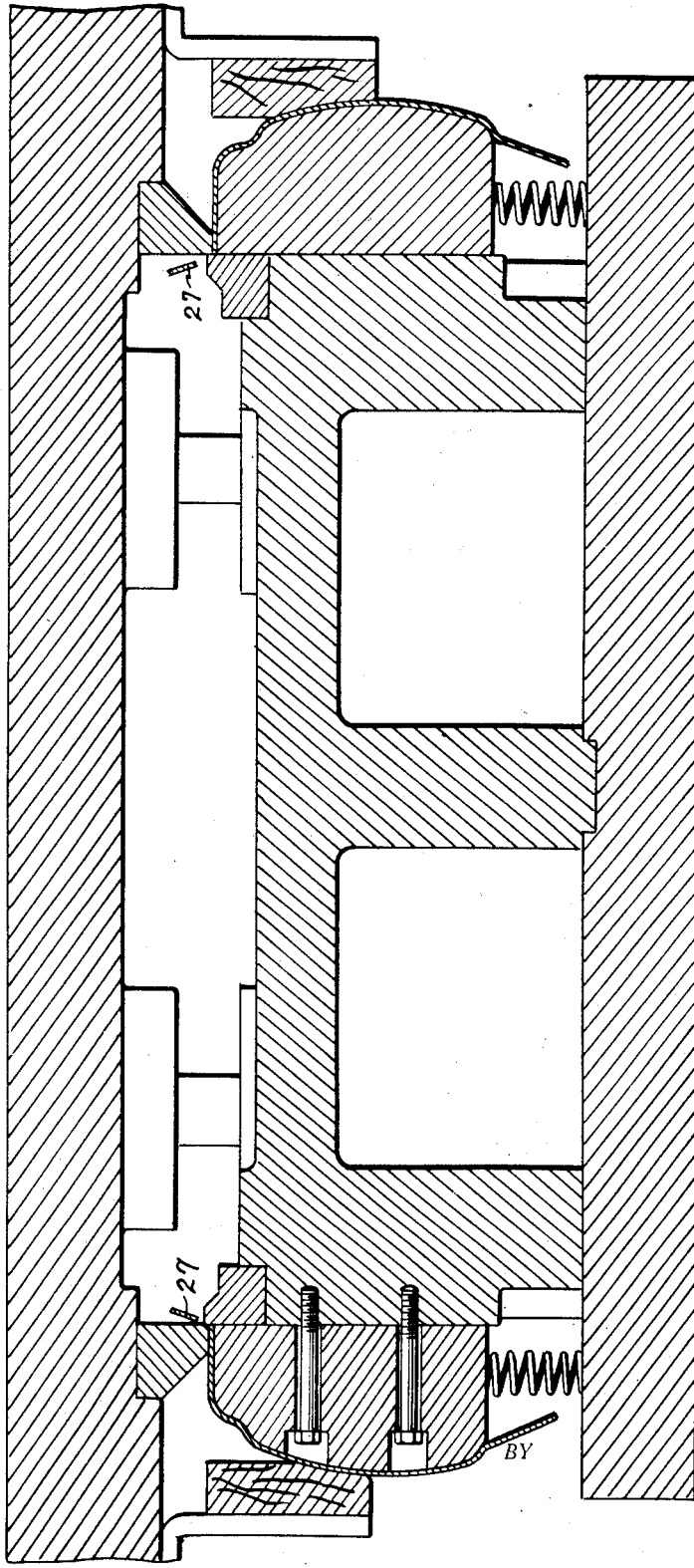

Aug. 14, 1928.   1,680,467
M. H. MATHESON
METHOD OF MANUFACTURING AUTOMOBILE FENDERS
Filed Aug. 23, 1926    5 Sheets-Sheet 5
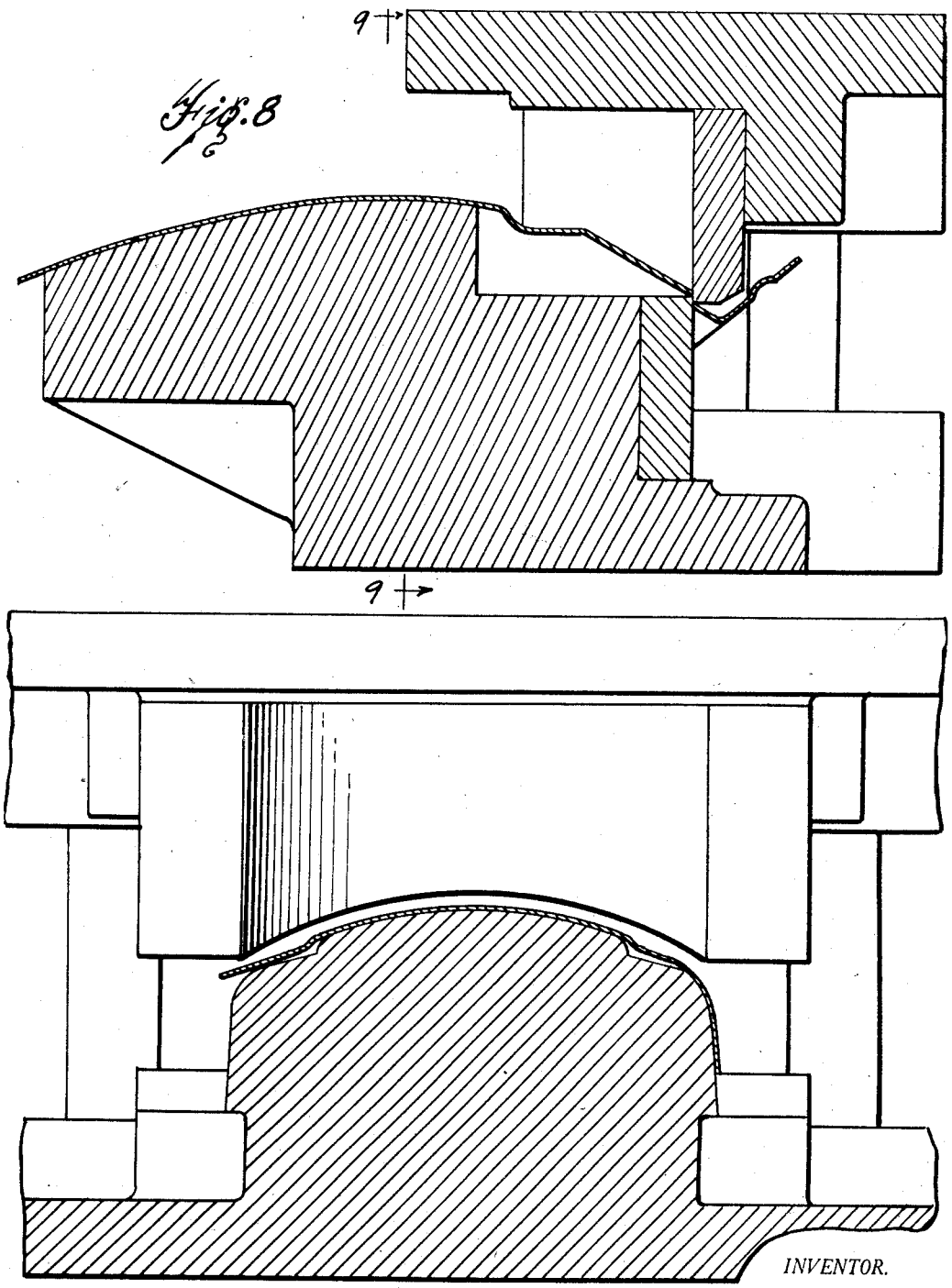
INVENTOR.
MARTIN H. MATHESON
BY
Parker & Burton
ATTORNEY.

Patented Aug. 14, 1928.

1,680,467

UNITED STATES PATENT OFFICE.

MARTIN H. MATHESON, OF DETROIT, MICHIGAN.

METHOD OF MANUFACTURING AUTOMOBILE FENDERS.

Application filed August 23, 1926. Serial No. 130,903.

My invention relates to an improved method of manufacturing fenders for automobiles. Automobile fenders are stamped out of sheet metal and heretofore it has been the practice to stamp out each fender separately. Each complete fender was formed from a sheet metal blank as the result of a multiplicity of successive operations. I propose, with my invention herein set forth, to materially simplify the method of manufacturing fenders and substantially reduce the cost of their manufacture. My invention is particularly adapted to the manufacture of the front fenders for motor vehicles.

Not only does my improved process result in a reduction in the cost of manufacturing fenders but it permits the manufacture thereof with less material than has been necessary with the methods heretofore employed. Furthermore, it absolutely insures the production of fenders in pairs whereby the number of right fenders produced always equals the number of left fenders produced, thereby eliminating waste due to that not uncommon occurrence of producing more right fenders than left.

I have also found that with the use of my process a better, more substantial and durable fender is produced than with the use of the process heretofore employed. My improved process of manufacture places the greatest strain upon the metal at those points which, when the fender is completed, are subjected to the least strain and places the least strain and therefore subjects to the least distortion those parts of the fender which, when the fender is completed, are subjected to the greatest strain. My improved fender is therefore strongest at those points where it should be strongest.

During the process of stamping a fender from sheet metal, considerable strain is placed upon the material. This strain distorts the metal and leaves it weak at those points where the strain was greatest. With my improved process of manufacture this strain is placed upon the material at those points which, when the fender is completed, are subjected to the least strain. Those advantageous results above set forth and many others hereinafter more specifically brought out flow directly from my improved process of manufacture.

In the drawings:

Fig. 6 is a cross-sectional view through the stamp blank and press mechanism suitable for splitting the two fenders apart.

Figs. 7, 8, 9, and 10, illustrate in cross-section successive steps in the trimming of a fender according to my improved process.

Figure 1:
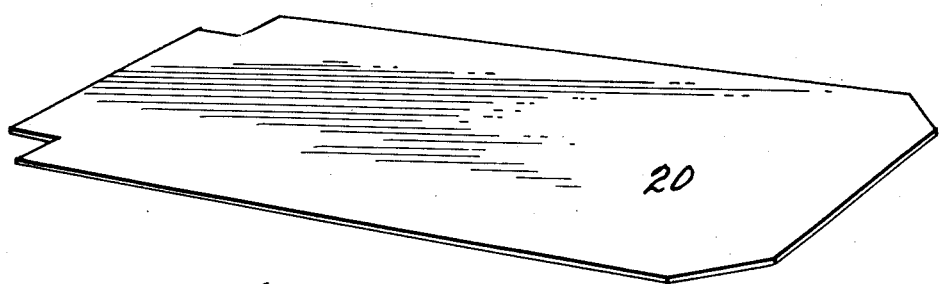
Fig. 1 is a perspective of a sheet metal blank suitable to be used in the forming of a pair of fenders according to my improved process.
Figure 4:
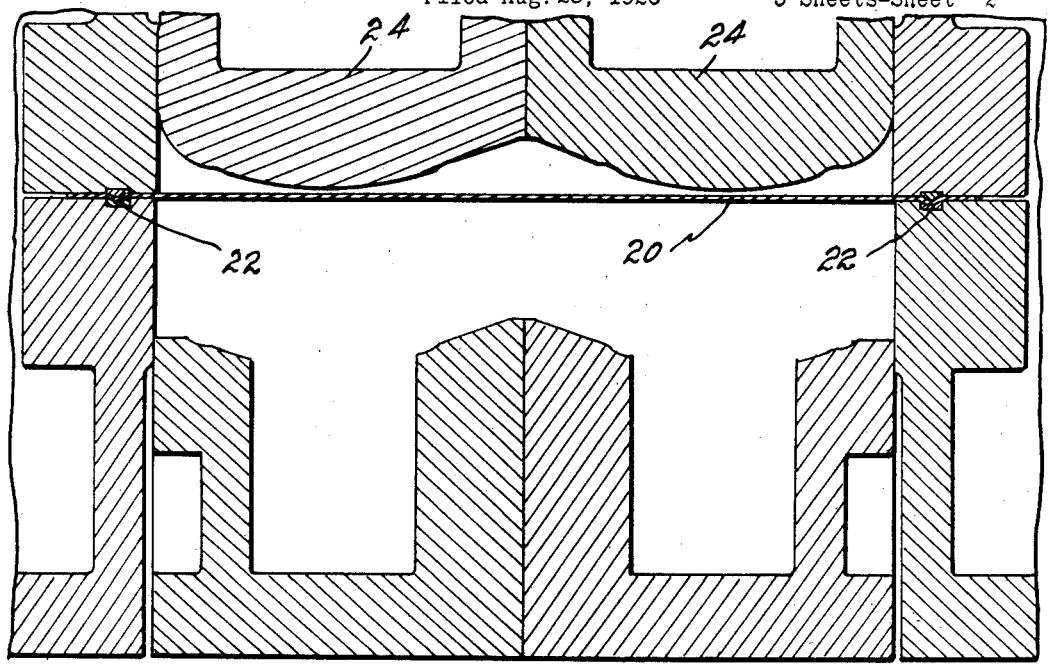
Fig. 4 is a cross-sectional view through the forming die for the first operation showing the blank in position therein.

I provide a sheet metal blank of suitable shape and size to be used in the forming of a pair of front fenders for an automobile. This blank is shown in Fig. 1 and is indicated in Fig. 4 by the reference character 20. In Fig. 4 there is shown in cross-section, the cooperating parts of the forming die which shape the blank to form the two fender structures. The blank is held along opposite edges as at 22 and the two punch members 24 press the same down into the shape shown in Fig. 5, in which shape it is indicated as 21.

It will be seen that in the shaping of the blank the greatest strain is exerted upon that portion of the metal adjacent the line along which it is held down and that the intermediate portion of the metal between those portions which are shaped to form the fenders is subjected to relatively less strain.

This strain, with its resulting distortion of the metal, weakens the edge portions of the sheet metal blank while the intermediate portion referred to, being subjected to considerably less strain and consequently less distortion, is not so weakened.

Due to the fact that the fenders are formed in pairs, the number of right fenders will always equal the number of left fenders. Furthermore, less material will be required to form two fenders in the manner herein set forth than were each fender formed separately. In the stamping of individual fenders, according to the present practice, it is necessary to provide enough material to permit the blank to be held along each edge of the fender to be formed, which excess of material must, of necessity, be cut away in completing the manufacture of the fender. With my improved process it is not necessary to cut away any more material for two fenders than it has heretofore been necessary to cut away in the forming of one.

Figure 2:
Fig. 2 is a perspective of the blank after the completion of the first stamping operation.
Figure 3:
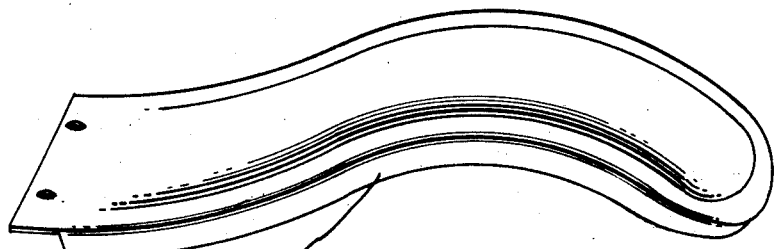
Fig. 3 is a perspective of the completed fender.
Figure 5:
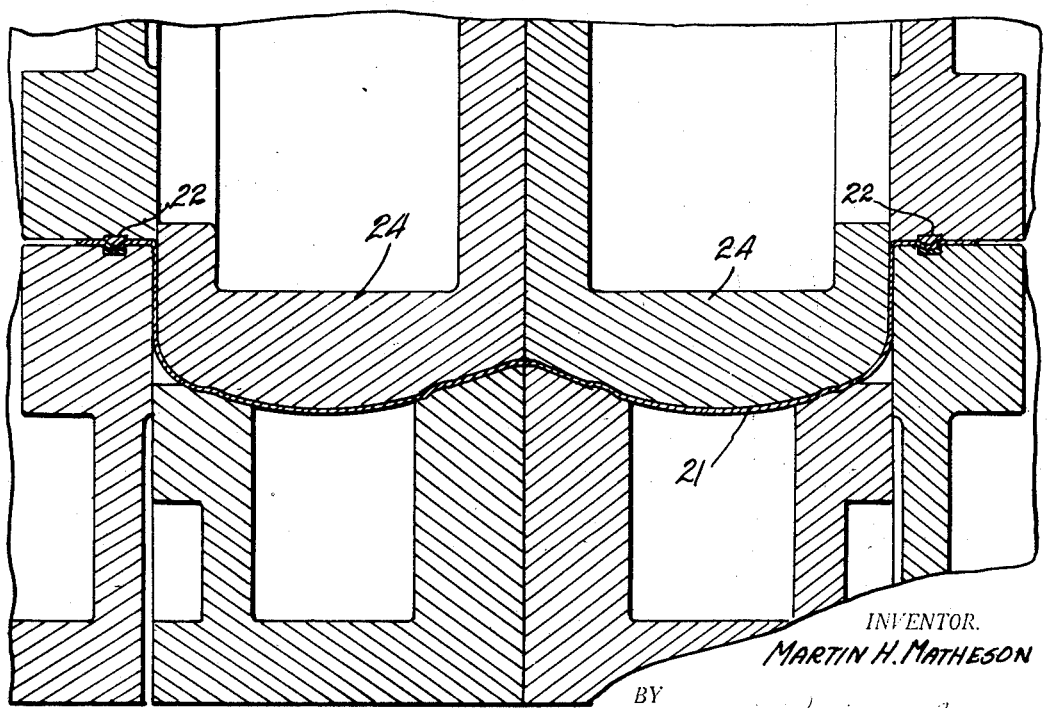
Fig. 5 is a similar cross-sectional view on the same line as Fig. 4 after completion of the forming operation.

The metal blank as shaped following that step in the process shown in Figs. 4 and 5 is in the form illustrated in Fig. 2 of the drawing. This shaped blank 21 is placed in a shearing die such as illustrated in Fig. 6 and a cutting knife 26 is employed to split the two fenders apart. The separate fenders are then placed in a second shearing die such as is shown in Fig. 7 and the excess of metal 27 is removed as indicated. The trimming process is continued as is set forth in Figs. 8, 9, and 10. In Fig. 8 the front end of the fender is trimmed. Fig. 9 is a cross-sectional view on the line 9—9 of Fig. 8. In Fig. 10 the opposite end of the fender is trimmed and holes are punched therein.

In the forming of a fender it will be seen that the edge portions of the sheet metal blank have been utilized to form the outer edge 28 of the fender and that the inner edge comprises the material which constituted the intermediate portion of the blank. In securing the fender to the apron, it is fastened along such inner edge. This point is a point which bears the strain of supporting the fender and which, due to this fact, is most apt to break during use. However, since the inner edge portion of the fender has been formed from material which was subjected to the least strain during the stamping process, such material has not been substantially weakened during the course of manufacture and that portion of the material which was weakened during the course of manufacture has, as a result of the process employed, been shaped to form the outer edge portion of the fender which does not bear any strain.

What I claim is:

1. That method of manufacturing automobile fenders which includes stamping a right fender and its complementary left fender from a unitary sheet metal blank at one and the same time and forming the inner edge portion of each complete fender from the intermediate portion of the blank.

2. That method of manufacturing automobile fenders which includes holding a sheet metal blank along opposite edges, stamping the blank so held to form a right fender and its complementary left fender at one and the same operation and forming the outer edge portion of one fender from that portion of the blank adjacent to one held edge thereof and forming the outer edge portion of the other fender from that portion of the blank adjacent to the other held edge thereof and forming the inner edge portion of each fender from the intermediate portion of the blank.

3. That method of manufacturing an automobile front fender having a crown, an outer edge portion bent downwardly substantially at a right angle to the crown and an inner edge portion sloping gradually downwardly away from the crown at a slight angle which comprises holding a unitary sheet metal blank along opposite edges, stamping the blank so held to form therein at one operation a right fender and its complementary left fender, said stamping operation including subjecting that portion of the blank adjacent to each of said held edges to substantially the same amount of distortion and to a substantially greater distortion than the intermediate portion of the blank and forming therefrom the outer edge portions of the two fenders, and subjecting the intermediate portion of the blank to substantially less distortion and forming therefrom the inner edge portions of the two fenders, separating the two fenders stamped in the blank and trimming each to size.

4. That method of shaping an automobile fender blank as an intermediate step in the manufacture of automobile fenders comprising stamping a unitary sheet metal blank to form with one and the same operation a right fender and its complementary left fender, and forming the outer longitudinal edge portion of each fender from an outer edge portion of the blank and forming the inner edge portion of each fender from the intermediate portion of the blank.

5. That step in a method of manufacturing a pair of automobile front fenders comprising holding a unitary sheet metal blank along opposite edges, stamping the blank so held to form at one and the same operation a pair of complementary front fenders, said stamping operation including subjecting that portion of the blank adjacent to each held edge to considerable distortion and forming therefrom and at substantially a right angle thereto the outer edge portion of one of the fenders and subjecting the intermediate portion of the blank to very considerably less distortion and forming therefrom and at a relatively slight angle thereto the inner edge portion of each fender.

6. An intermediate product in the stamping of automobile front fenders from sheet metal comprising a unitary sheet metal stamped fender blank having a pair of complementary front fenders stamped therein, being a right fender and its complementary left fender, said fenders having their inner edge portions united and formed from an intermediate portion of the blank and each sloping gradually upwardly toward the crown of its fender and each fender having its outer edge portion formed from an outer edge portion of the blank and bent sharply and at substantially a right angle to the original plane of the blank.

In testimony whereof, I sign this specification.

MARTIN H. MATHESON.